United States Patent [19]

Giudici

[11] Patent Number: 5,144,853
[45] Date of Patent: Sep. 8, 1992

[54] DEVICE FOR ADJUSTING THE POSITION OF A VEHICLE GEAR-SHIFT LEVER

[75] Inventor: Marino Giudici, Nerviano, Italy

[73] Assignee: Fiat Auto S.p.A., Turin, Italy

[21] Appl. No.: 725,516

[22] Filed: Jul. 3, 1991

[30] Foreign Application Priority Data

Jul. 3, 1990 [IT] Italy .................. 20844 A/90

[51] Int. Cl.⁵ ............... B60K 20/04; G05G 9/00
[52] U.S. Cl. ............... 74/473 R; 180/334; 180/336
[58] Field of Search ........... 251/290; 74/473 R; 180/334, 336; 403/92, 93, 96

[56] References Cited

U.S. PATENT DOCUMENTS

| | | | |
|---|---|---|---|
| 2,854,088 | 9/1958 | Dence | 74/473 R X |
| 3,937,294 | 2/1976 | Haddock | 74/473 R X |
| 4,050,325 | 9/1977 | Shishido | 74/473 R |
| 4,157,740 | 6/1979 | Jackson | 74/473 R X |
| 4,364,450 | 12/1982 | Kemp et al. | 74/473 R X |
| 4,541,300 | 9/1985 | Kwiatkowski et al. | 74/473 R X |
| 4,693,135 | 9/1987 | LaRocca et al. | 74/473 R |
| 4,702,520 | 10/1987 | Whisler et al. | 180/334 X |
| 4,815,765 | 3/1989 | Peterson | 180/334 X |
| 4,821,837 | 4/1989 | Fifer | 180/334 |

FOREIGN PATENT DOCUMENTS

| | | | |
|---|---|---|---|
| 3613480 | 11/1987 | Fed. Rep. of Germany . | |
| 2644115 | 9/1990 | France . | |
| 62-100820 | 5/1987 | Japan | 74/473 R |
| 1595342 | 8/1981 | United Kingdom . | |

*Primary Examiner*—Leslie A. Braun
*Assistant Examiner*—David E. Henn
*Attorney, Agent, or Firm*—Longacre & White

[57] ABSTRACT

A device for adjusting the position of a gear-shift lever in a vehicle in which a lever operating flexible cables for gear selection and engagement is disposed on a plate which is mobile by pivoting and is provided with a slot member engaged with a pin provided with a locking lever. The position assumed by the plate and consequently the position assumed by the gear-shift lever are determined by sliding the slot member engaged with the pin. As an alternative to the slot member with the pin and locking lever a motor-reduction gear unit can be used to impose movement on the plate via a strut.

9 Claims, 4 Drawing Sheets

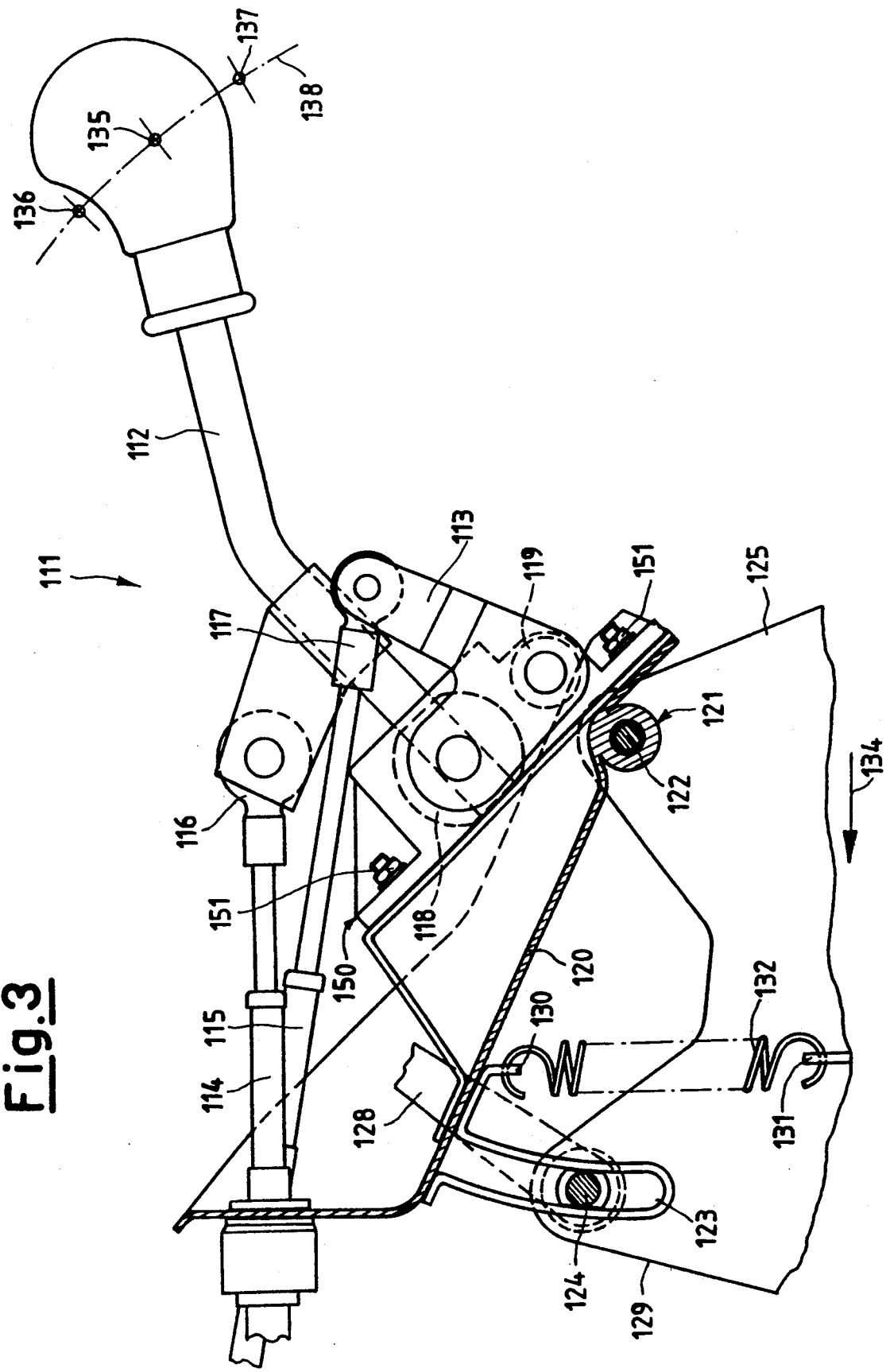

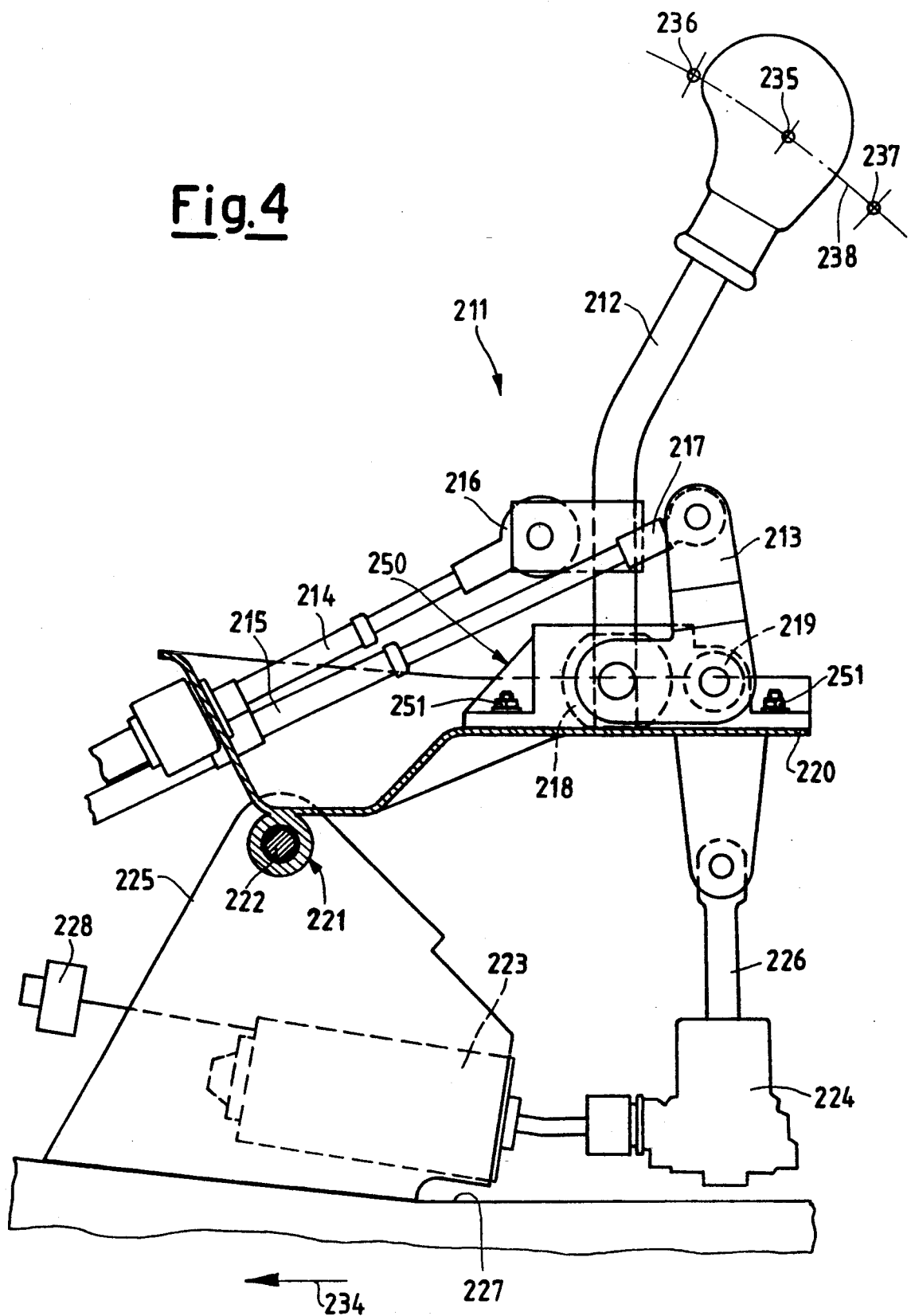

DEVICE FOR ADJUSTING THE POSITION OF A VEHICLE GEAR-SHIFT LEVER

This invention relates to a device for adjusting the position of a vehicle gear-shift lever.

Vehicle gear-shift levers are known in which, by means of an articulated joint, the position of a lever constructed substantially in two separate parts can be varied in terms of height along a single axis.

Current ergonomic requirements dictate that the driving position should be adaptable to the characteristics of any driver, and hence the main object of the present invention is to provide a device for adjusting the position of the gear-shift lever along composite axes, to be able to best adapt the driving compartment to any driver.

A further object of the present invention is to provide a device which, based on the same inventive concepts, can be used on different types of vehicles, by which is meant vehicles having driving compartments with different dimensional characteristics, such as the steering wheel position, seat position and height, and length and shape of the gear-shift lever.

These objects are attained by a device for adjusting the position of a gear-shift lever in a vehicle in which gear engagement and selection is controlled by a pair of flexible cables, a first of said cables being fixed to said lever for controlling engagement, the second of said cables being fixed to a member associated with said lever via a connection rod for controlling gear selection, said lever and said member associated therewith being provided with respective ball joints, characterized in that said lever, said member associated therewith and the respective ball joints are fixed on a mobile support plate, said plate being rotatably pivoted at one end to a sheet metal portion of a vehicle and carrying at its opposite end means for adjusting and stably positioning said pivoted plate.

In a first embodiment of the device according to the invention, said means for adjusting and stably positioning said pivoted plate consist of an arched slot member disposed essentially vertically and fixed to the underside of said plate, said slot member being slidingly engaged with a pin provided at one end with a lever for stably clamping said mobile plate, said pin being supported by another sheet metal portion of said vehicle.

Again according to the invention, said slot member and said other sheet metal portion are provided with respective rings for engaging a return spring for said mobile plate.

Said pin provided at one end with a clamping lever and engaged with said slot member is a pin of square cross-section carrying at its other end a locking nut and washer.

In another embodiment of the device according to the invention, said means for adjusting and stably positioning said pivoted plate consist of a servomotor-reduction gear unit disposed below said plate, said unit being fixed to a sheet metal portion of said vehicle, said reduction gear being connected to said plate by a strut, the adjustment of said plate being controlled by actuator means provided within said vehicle.

Again according to the invention said slot member and said pin are situated in a position substantially corresponding with said gear-shift lever, said plate being pivoted frontwards of said gear-shift lever with respect to the vehicle running direction. Alternatively, said plate is pivoted in a position corresponding with said gear-shift lever, said slot member and said pin being situated frontwards of said gear-shift lever with respect to the vehicle running direction.

According to the invention said strut connected to said plate and said reduction gear are disposed in a position corresponding with said gear-shift lever, said plate being pivoted frontwards of said gear-shift lever with respect to the vehicle running direction, and said motor being disposed in proximity to the pivoting point of said plate.

Alternatively, said strut connected to said reduction gear is disposed frontwards of said gear-shift lever with respect to the vehicle running direction, said motor being disposed in proximity to said gear-shift lever and to the pivoting point of said plate.

The technical characteristics and further advantages of the present invention will be more apparent from the description given hereinafter by way of non-limiting example with reference to the accompanying drawings in which:

FIG. 3 is a partly sectional side view of a further embodiment of the device according to the invention; and FIG. 4 is a partly sectional side view of a further embodiment of the device according to the invention.

Figure 1:
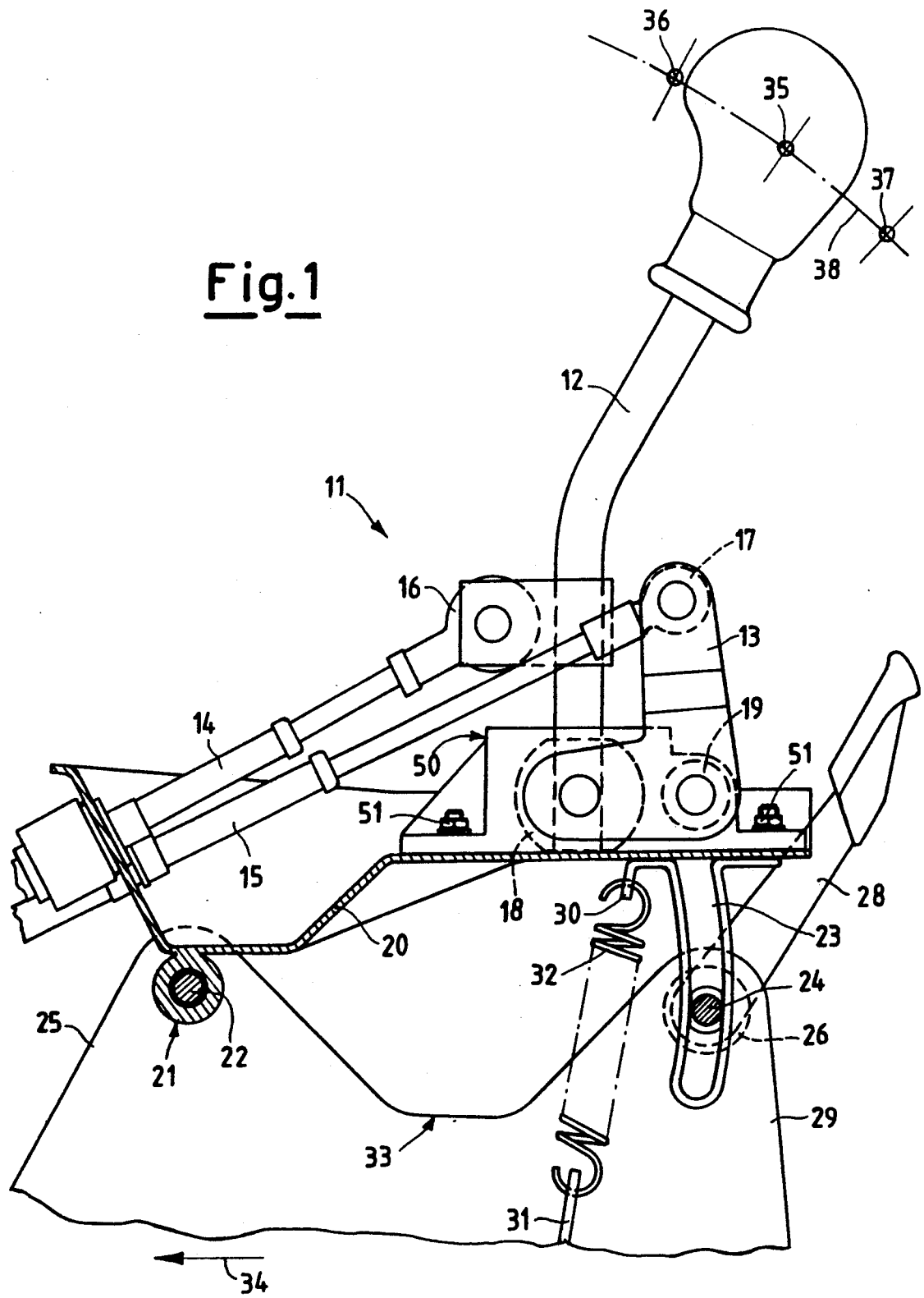
FIG. 1 is a partly sectional side view of one embodiment of the device according to the invention.
Figure 2:
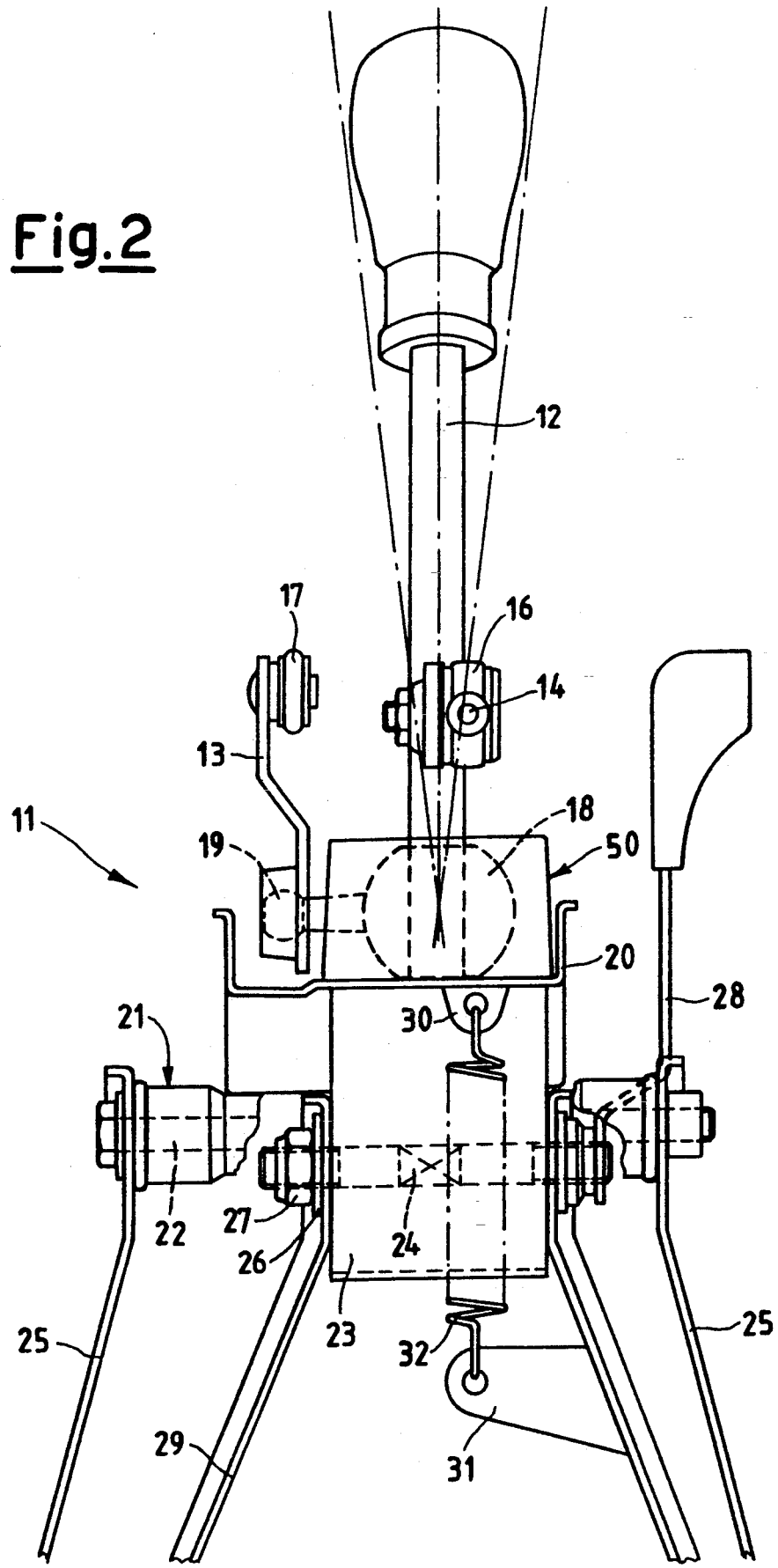
FIG. 2 is a front view of the device of FIG.1.

In the figures the reference numeral 11 indicates overall an adjusting device according to the invention in which a gear-shift lever 12 is provided laterally with a member 13, there being connected respectively to the lever 12 and member 13 a first flexible cable 14 for gear engagement and a second flexible cable 15 for gear selection. The cables 14 andd 15 are connected to their respective levers by jointed fixing elements indicated by 16 and 17. The lever 12 and member 13 associated therewith are provided with respective ball joints 18 and 19.

The unit comprising the lever 12, member 13 and the respective ball joints 18 and 19 is supported by a plate 20 connected at one end to a bush 21 rotatable about a pin 22 supported by a sheet metal portion 25 of the vehicle.

The ball joints 18 and 19 are enclosed in a housing indicated overall by 50 and fixed to the plate 20 by suitable bolts 51. The plate 20 is pivoted about the pin 22 and is provided on its underside, at the opposite end to the pin 22, with an arched slot member 23 engaged with a square pin 24.

The square pin 24 is provided at one end with washers 26 and a nut 27, at its other end there being provided a rotatable locking lever 28.

The pin 24 together with the lever 28 and nut 27 are supported by a further sheet metal portion 29 of the vehicle. Both the arched slot member 23 and the sheet metal portion 29 are provided with respective rings 30 and 31 in which a spring 32 engages.

The sheet metal portions pertain to the vehicle floor indicated overall by 33, the reference numeral 34 indicating an arrow representing the vehicle running direction. It can be seen that in this embodiment the slot member 23 and pin 24 are situated in a position corresponding with said gear-shift lever 12, whereas the plate is pivoted frontwards of the lever with respect to the vehicle running direction defined by the arrow 34.

For other types of vehicles with a more restricted compartment space, the general arrangement of the device 111 is illustrated in FIG. 3 in which a gear-shift lever 112 provided laterally with a member 113 is connected the former to an engagement flexible cable 114 and the latter to a selection flexible cable 115. The cables are fixed by jointed fixing elements indicated by 116 and 117.

The lever 112 and member 113 are provided with respective ball joints 118 and 119 and are supported overall by a plate 120 connected at one end to a bush 121 which is rotatable about a pin 122 supported by a sheet metal portion 125 of the vehicle. The ball joints 118 and 119 are enclosed within a housing 150 fixed to the plate 120 by suitable bolts 151. The plate 120 is therefore pivoted about the pin 122 and is provided on its underside, at the opposite end to the pin 122, with an arched slot member 123 engaged with a square pin 124.

In the manner already described, the square pin 124 is provided at one end with a nut and washer (not shown in this case), a rotatable locking lever 128 being provided at the other end. The pin 124 together with the lever 128, nut and washers (not shown) is supported by a further sheet metal portion 129 of the vehicle.

Both the arched slot member 123 and the sheet metal portion 129 are provided with respective rings 130 and 131, in which a spring 132 engages.

To facilitate interpretation of the drawing, the reference numeral 134 indicates an arrow representing the vehicle running direction. In this embodiment, the pin 122 and bush 121 are situated in a position corresponding with the gear lever 112, whereas the arched slot member 123 and pin 124 are frontwards of the gear-shift lever 112 with respect to the vehicle running direction defined by the arrow 134.

Compared with the first described embodiment the pivoting of the support plate for the gear-shift lever 112 is reversed and the shape of the lever 112 is such that this device can be mounted in small-dimension compartments such as those of sports cars.

In a further embodiment according to the invention, in a device analogous to those of the aforegoing descriptions the plate positioning and locking means consisting of the slot member with its pin provided with the locking lever can be replaced by a suitable motorized drive.

For this purpose, FIG. 4 shows a lever 212 provided laterally with a member 213, flexible cables 214 and 215 for gear engagement and selection being fixed to these by means of jointed fixing elements 216 and 217.

The lever 212 and member 213 are provided with respective ball joints 218 and 219 and are supported overall by a plate 220 connected at one end to a bush 221 which is rotatable about a pin 222 supported by a sheet metal portion 225 of the vehicle, the plate 220 therefore being rotatable about the pin 222. Again in this embodiment the ball joints 218 and 219 are enclosed within a housing indicated overall by 250 fixed to the plate 220 by bolts 251.

Below the plate 220 in a position corresponding with the pin 222 there is provided a motor 223 connected to a reduction gear 224 provided with a strut 226 which is fixed to the plate 220 to enable this to undergo movement.

The motor, which is fixed to the vehicle floor indicated by 227, is provided with a control device 228 which can be conveniently positioned within the vehicle driving compartment in a suitable position. The various illustrated embodiments also indicate a central position (35, 135, and 235) and end positions (36, 136, 236, 37, 137, 237) which the gear-shift lever (12, 112, 212) can assume along a circumferential arc (38, 138, 238).

In this manner, using either manual or motorized adjustment, the gear-shift lever can undergo composite movement in two directions, to assume the most convenient position within the compartment for the driver concerned, and thus the best orientation in relation to the driver's position.

With the embodiments of FIGS 1 and 3, to make the adjustment it is necessary only to rotate the locking lever so that the arched slot member can slide guided by the square pin.

When the optimum position for the gear-shift lever has been found, the lever is again tightened on the square pin, which cannot rotate, to fix the plate in the desired position.

When the lever is released the plate tends to assume the minimum height position by the action of the return spring.

The plate is enabled to rotate by the nature of the flexible cables and by the relative jointed fixing elements.

I claim:

1. A device for adjusting the position of a gear-shift lever in a vehicle in which gear engagement and selection is controlled by a pair of flexible cables, a first of said cables being fixed to said lever and controlling the gear engagement, the second of said cables being fixed to a member associated with said lever via a connection rod and controlling the gear selection, said lever and said member associated therewith being provided with respective ball joints, characterized in that said lever, said member associated therewith and the respective ball joints are fixed on a mobile support plate, said plate being rotatably pivoted at one end to a sheet metal portion of the vehicle and carrying at its opposite end means adapted to infinitely adjust and stably position said plate within a range of motion of said plate.

2. A device as claimed in claim 1, characterized in that said means adapted to adjust and stably position said plate consists of an arched slot member disposed essentially vertically and fixed to the underside of said plate, said slot member being slidingly engaged with a pin provided at one end with a clamping lever which stably clamps/said slot member to said pin, said pin being supported by another sheet metal portion of said vehicle.

3. A device as claimed in claim 2, characterized in that said slot member and said other sheet metal portion are provided with respective rings engaging a return spring which biases said slot member with respect to said sheet metal portion.

4. A device as claimed in claim 2, characterized in that said pin provided at one end with a clamping lever and engaged with said slot member is a pin of square cross-section carrying at its other end a locking nut and washer.

5. A device as claimed in claim 1, characterized in that said means adapted to adjust and stably position said plate consist of a servomotor-reduction gear unit disposed below said plate, said unit being fixed to said sheet metal portion of said vehicle, said reduction gear being connected to said plate by a strut, the adjustment of said plate being controlled by actuator means provided within said vehicle.

6. A device as claimed in claim 2, characterized in that said slot member and said pin are situated in a position substantially corresponding with said gear-shift lever, said plate being pivoted frontwards of said gear-shift lever with respect to the vehicle running direction.

7. A device as claimed in claim 2, characterized in that said plate is pivoted in a position corresponding with said gear-shift lever, said slot member and said pin being situated frontwards of said gear-shift lever with respect to the vehicle running direction.

8. A device as claimed in claim 5, characterized in that said strut connected to said plate and said reduction gear are disposed in a position corresponding with said gear-shift lever, said plate being pivoted frontwards of said gear-shift lever with respect to the vehicle running direction, and said motor being disposed in proximity to the pivoting point of said plate.

9. A device as claimed in claim 5, characterized in that said strut connected to said reduction gear is disposed frontwards of said gear-shift lever with respect to the vehicle running direction, said motor being disposed in proximity to said gear-shift lever and to the pivoting point of said plate.

* * * * *